US 10,989,107 B2

(12) United States Patent
Asai

(10) Patent No.: US 10,989,107 B2
(45) Date of Patent: Apr. 27, 2021

(54) INTERNAL COMBUSTION ENGINE

(71) Applicant: Yanmar Co., Ltd., Osaka (JP)

(72) Inventor: Go Asai, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/316,513

(22) PCT Filed: Jun. 29, 2017

(86) PCT No.: PCT/JP2017/024047
§ 371 (c)(1),
(2) Date: Jan. 9, 2019

(87) PCT Pub. No.: WO2018/012307
PCT Pub. Date: Jan. 18, 2018

(65) Prior Publication Data
US 2019/0249597 A1 Aug. 15, 2019

(30) Foreign Application Priority Data

Jul. 14, 2016 (JP) .............................. JP2016-139574

(51) Int. Cl.
F02M 26/05 (2016.01)
F02B 69/02 (2006.01)
(Continued)

(52) U.S. Cl.
CPC ................ F02B 69/02 (2013.01); F02B 1/12 (2013.01); F02B 7/00 (2013.01); F02B 31/02 (2013.01);
(Continued)

(58) Field of Classification Search
CPC .... F02B 69/02; F02B 1/12; F02B 7/00; F02B 33/22; F02B 37/04; F02M 26/05;
(Continued)

(56) References Cited

U.S. PATENT DOCUMENTS 5,125,380 A * 6/1992 Nakae ................... F02B 25/145
123/257
2009/0283061 A1* 11/2009 Branyon ................. F02B 33/44
123/58.8
(Continued)

FOREIGN PATENT DOCUMENTS

JP 55-007954 A 1/1980
JP H06-323209 A 11/1994
(Continued)

OTHER PUBLICATIONS

International Search Report dated Sep. 5, 2017 issued in corresponding PCT Application PCT/JP2017/024047.
(Continued)

Primary Examiner — Syed O Hasan
(74) Attorney, Agent, or Firm — Norton Rose Fulbright US LLP

(57) ABSTRACT

An internal combustion engine including a fuel reformation cylinder for reforming a fuel and an output cylinder for yielding an engine power by combusting a fuel or a reformed fuel, wherein at least a part of the surfaces constituting a volume-variable reaction chamber of the fuel reformation cylinder has a highly heat-insulative material.

20 Claims, 8 Drawing Sheets

(51) Int. Cl.
| | |
|---|---|
| F02M 33/00 | (2006.01) |
| F02F 3/10 | (2006.01) |
| F02F 1/24 | (2006.01) |
| F02F 1/00 | (2006.01) |
| F02F 1/42 | (2006.01) |
| F02M 26/36 | (2016.01) |
| F02B 1/12 | (2006.01) |
| F02M 26/08 | (2016.01) |
| F02D 19/06 | (2006.01) |
| F02D 19/08 | (2006.01) |
| F02B 7/00 | (2006.01) |
| F02M 26/34 | (2016.01) |
| F02B 37/04 | (2006.01) |
| F02M 26/19 | (2016.01) |
| F02B 33/22 | (2006.01) |
| F02D 41/00 | (2006.01) |
| F02B 31/02 | (2006.01) |
| F02B 51/00 | (2006.01) |
| F02M 31/20 | (2006.01) |
| F02M 31/08 | (2006.01) |
| F02B 29/04 | (2006.01) |
| F02M 26/28 | (2016.01) |

(52) U.S. Cl.
CPC .............. *F02B 33/22* (2013.01); *F02B 37/04* (2013.01); *F02B 51/00* (2013.01); *F02D 19/0671* (2013.01); *F02D 19/08* (2013.01); *F02D 19/081* (2013.01); *F02D 41/0025* (2013.01); *F02F 1/00* (2013.01); *F02F 1/24* (2013.01); *F02F 1/42* (2013.01); *F02F 3/10* (2013.01); *F02M 26/05* (2016.02); *F02M 26/08* (2016.02); *F02M 26/19* (2016.02); *F02M 26/34* (2016.02); *F02M 26/36* (2016.02); *F02M 33/00* (2013.01); *F02B 29/0406* (2013.01); *F02M 26/28* (2016.02); *F02M 31/08* (2013.01); *F02M 31/20* (2013.01); *Y02T 10/12* (2013.01); *Y02T 10/30* (2013.01)

(58) Field of Classification Search
CPC ........ F02M 26/08; F02M 26/19; F02M 26/34; F02M 36/36
See application file for complete search history.

(56) References Cited

U.S. PATENT DOCUMENTS

| | | | |
|---|---|---|---|
| 2015/0369178 A1* | 12/2015 | Asai | ........................ F02M 26/19 123/3 |
| 2016/0018315 A1* | 1/2016 | Wang | ..................... G01N 3/567 73/150 A |
| 2017/0284315 A1* | 10/2017 | Asai | ........................ F02M 33/00 |

FOREIGN PATENT DOCUMENTS

| | | |
|---|---|---|
| JP | 2000-178004 A | 6/2000 |
| JP | 2001-173446 A | 6/2001 |
| JP | 2007-192062 A | 8/2007 |
| JP | 2008-127996 A | 6/2008 |
| JP | 2014-136978 A | 7/2014 |
| JP | 2016-056704 A | 4/2016 |
| JP | 2016-094930 A | 5/2016 |
| WO | 2016/035735 A1 | 3/2016 |

OTHER PUBLICATIONS

European Search Report dated Jun. 11, 2019 issued in corresponding EP Application 17827437.9.

* cited by examiner

INTERNAL COMBUSTION ENGINE

CROSS REFERENCES TO RELATED APPLICATIONS

This application is a national stage application pursuant to 35 U.S.C. § 371 of International Application No. PCT/JP2017/024047, filed on Jun. 29, 2017 which claims priority under 35 U.S.C. § 119 to Japanese Patent Application No. 2016-139574 filed on Jul. 14, 2016, the disclosures of which are hereby incorporated by reference in their entireties.

TECHNICAL FIELD

The present invention relates to an internal combustion engine having a fuel reformation cylinder for reforming fuel and an output cylinder for yielding an engine power by combustion of fuel or reformed fuel.

BACKGROUND ART

For example, Patent Literature 1 (Hereinafter, PTL 1) describes an internal combustion engine having a fuel reformation cylinder for reforming fuel and an output cylinder for obtaining an engine power by combustion of fuel or reformed fuel.

Specifically, a fuel such as light oil or heavy oil is supplied to the fuel reformation cylinder, and an air-fuel mixture having a high equivalence ratio is adiabatically compressed within the fuel reformation cylinder. As a result, the fuel is reformed under a high temperature and high pressure environment, and a reformed fuel (fuel with a high octane value) having a high anti-knock property such as hydrogen, carbon monoxide, and methane is generated. This reformed fuel is then supplied to the output cylinder together with the air, and the lean mixture is combusted (uniform lean combustion) in the output cylinder, to yield an engine power.

With this type of internal combustion engine, uniform lean combustion is performed in the output cylinder. The NOx emission amount and the soot discharge amount can therefore be reduced. Further, since a fuel with a high anti-knock property is combusted, knocking is suppressed or reduced, and since diesel micro-pilot ignition enables combustion at a suitable timing, the combustion efficiency can be also improved.

CITATION LIST

Patent Literature

PTL 1: Japanese Patent Application Laid-Open No. 2014-136978

SUMMARY OF INVENTION

Technical Problem

The present inventors have found that, when reforming fuel in a fuel reformation cylinder, a light gas concentration in a reformed gas increases proportionally as the temperature of a reaction gas increases (see FIG. 8). In other words, the inventors have found that the higher the temperature of the reaction gas, the higher the reforming efficiency of the fuel becomes, and thus the present invention has been proposed based on this finding.

It is an object of the present invention to improve fuel reforming efficiency as much as possible in an internal combustion engine having a fuel reformation cylinder for reforming fuel and an output cylinder for yielding an engine power by combustion of fuel or reformed fuel.

Solution to Problem

An aspect of the present invention is an internal combustion engine including a fuel reformation cylinder for reforming a fuel and an output cylinder for yielding an engine power by combusting fuel or reformed fuel, wherein at least a part of a surface constituting a volume-variable reaction chamber of the fuel reformation cylinder has a highly heat-insulative material.

This structure can reduce heat radiation from the reaction chamber to the outside, i.e., reduce the heat loss from the reaction chamber, when the fuel is reformed in the reaction chamber.

Accordingly, the temperature during the reforming reaction of fuel in the reaction chamber can be maintained higher as compared to a case where the highly heat-insulative material is not employed. Therefore, the reforming efficiency of the fuel can be improved as compared with the case where the highly heat-insulative material is not employed.

Further, the surfaces constituting the reaction chamber are preferably an inner circumferential surface of the fuel reformation cylinder and a top surface of a piston housed in the fuel reformation cylinder in a cylinder block, and a blast surface covering the fuel reformation cylinder in a cylinder head, wherein at least one of these surfaces is made of the highly heat-insulative material.

The above specifies that the surface constituting the reaction chamber exists in a plurality of separate members, and specifies that a surface made of the highly heat-insulative material.

More specifically, the present invention encompasses a mode of forming a highly heat-insulative material on all the surfaces constituting the reaction chamber; a mode of forming a highly heat-insulative material on one of the inner circumferential surface of the fuel reformation cylinder and the top surface of the piston in the cylinder block, and the blast surface of the cylinder head; and a mode of forming a highly heat-insulative material on any two of the inner circumferential surface of the fuel reformation cylinder and the top surface of the piston hosed housed in the cylinder block, and the blast surface of the cylinder head covering the fuel reformation cylinder.

Further, a flow speed of a stirring flow by a swirl flow, a tumble flow, and squish in the reaction chamber is preferably reduced as compared to that in a combustion chamber of the output cylinder.

A conceivable measure for reducing the flow speed of the swirl flow and the tumble flow is defining at least one of the connection position and the inclination angle of an air-intake port relative to the reaction chamber. More specifically, the above measure can be any one of the following modes: reducing an offset amount in a radial direction of a central axis of the air-intake port with respect to a center of the reaction chamber in a plan view; reducing an inclination angle of the air-intake port with respect to a central axis of the reaction chamber in a side view; and increasing a passage area of the air-intake port to suppress or reduce its change.

A conceivable measures for lowering the flow speed of the stirring flow by the squish are: reducing unevenness of the top surface of the piston for fuel reformation as small as possible, preferably flattening the top surface of the piston;

and increasing a top clearance (an opposing distance between the piston 22 positioned at a top dead point and a blast surface 1*f* of the cylinder head 1*b*).

This structure can reduce heat radiation from the surfaces constituting the reaction chamber to the outside, i.e., reduce the heat loss from the reaction chamber, when the fuel is reformed in the reaction chamber.

Further, an external reaction chamber having a constant volume is preferably provided outside the reaction chamber and communicated with the reaction chamber through a communication passage, and the fuel to be reformed is preferably supplied to the external reaction chamber.

In this structure, the fuel to be reformed is directly supplied to the external reaction chamber, and the fuel to be reformed is not directly supplied to the reaction chamber.

Since the fuel hardly adheres to the surfaces constituting the reaction chamber, the risk of adhered fuel being scraped off by the reciprocation of the piston can be reduced.

Although the supplied fuel may adhere on the inner surface of the external reaction chamber, the fuel is evaporated by an increase in the pressure and an increase in the temperature with rising of the piston.

The inner surface of the external reaction chamber is preferably made of a highly heat-insulative material.

This structure can reduce heat radiation from the inner surface of the external reaction chamber to the outside, i.e., reduce the heat loss from the external reaction chamber, when the fuel is reformed in the external reaction chamber.

Accordingly, the temperature during the reforming reaction of fuel supplied to the external reaction chamber can be maintained higher as compared to a case where the highly heat-insulative material is not employed. Therefore, the reforming efficiency of the fuel can be improved as compared with the case where the highly heat-insulative material is not employed.

Advantageous Effects of Invention

The present invention can improve fuel reforming efficiency as much as possible in an internal combustion engine having a fuel reformation cylinder for reforming fuel and an output cylinder for yielding an engine power by combustion of fuel or reformed fuel.

DESCRIPTION OF EMBODIMENTS

The following describes in detail preferred embodiments of the present invention with reference to the attached drawings.

Figure 1:
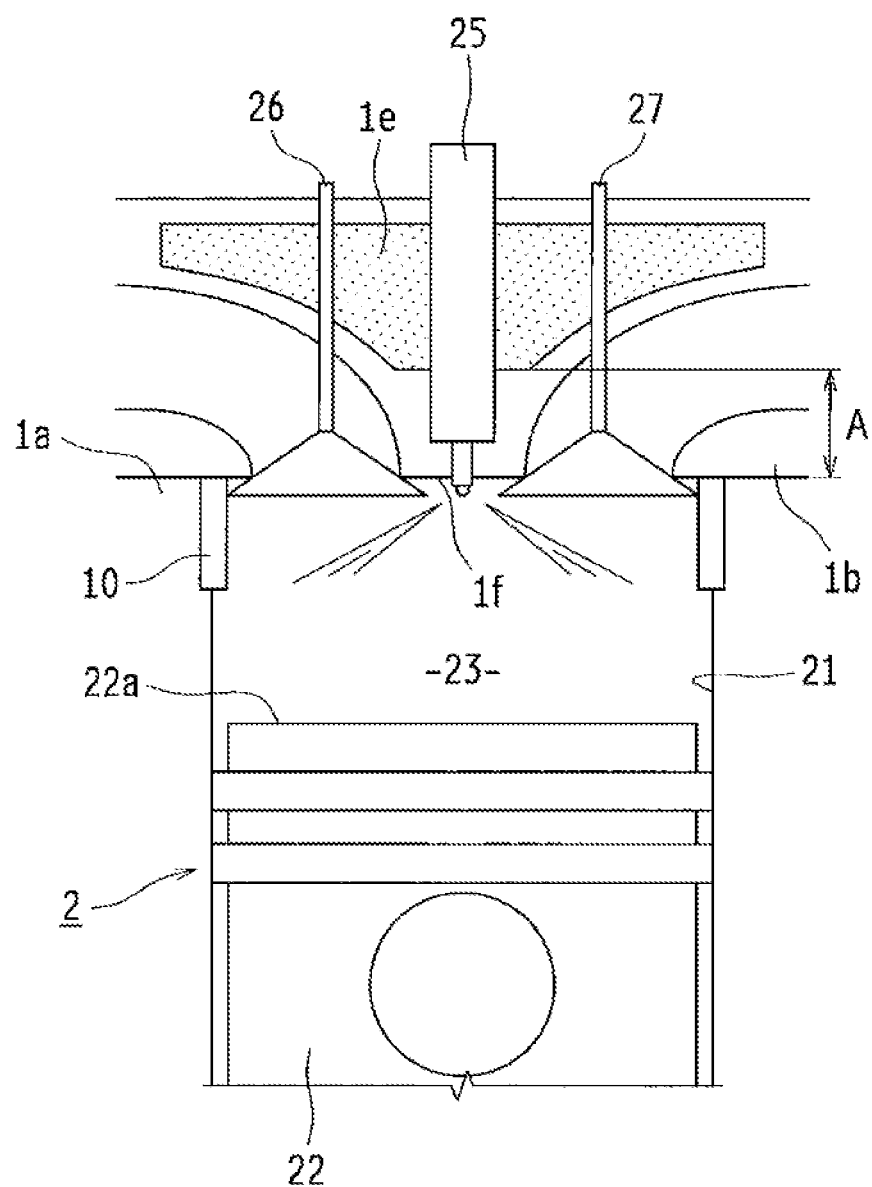
FIG. 1 is a diagram showing only a fuel reformation cylinder shown in FIG. 3.
Figure 2:
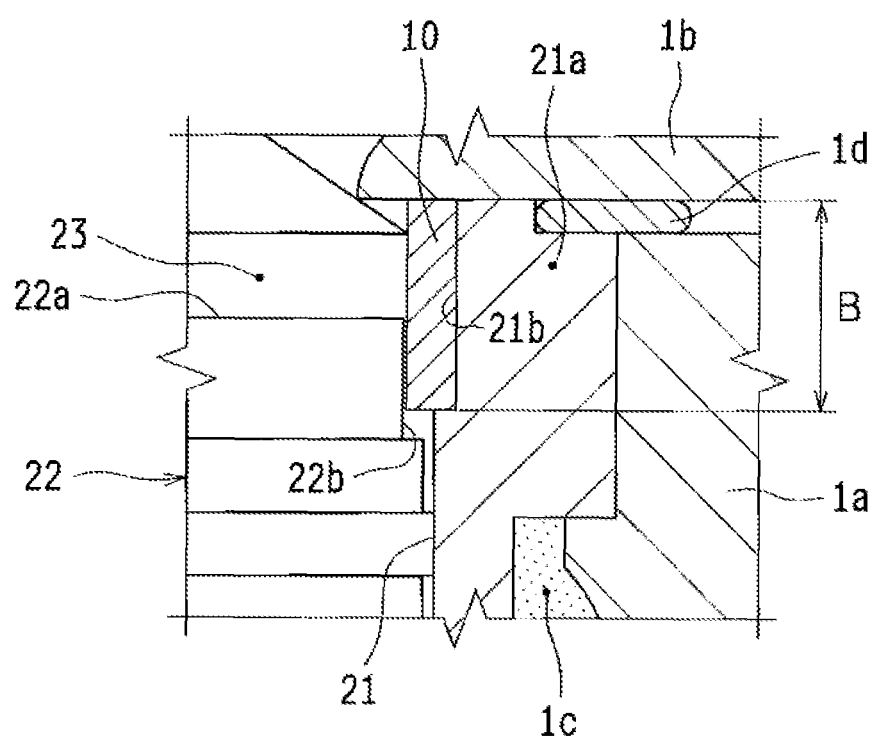
FIG. 2 is an enlarged view of an essential part of FIG. 1.
Figure 3:
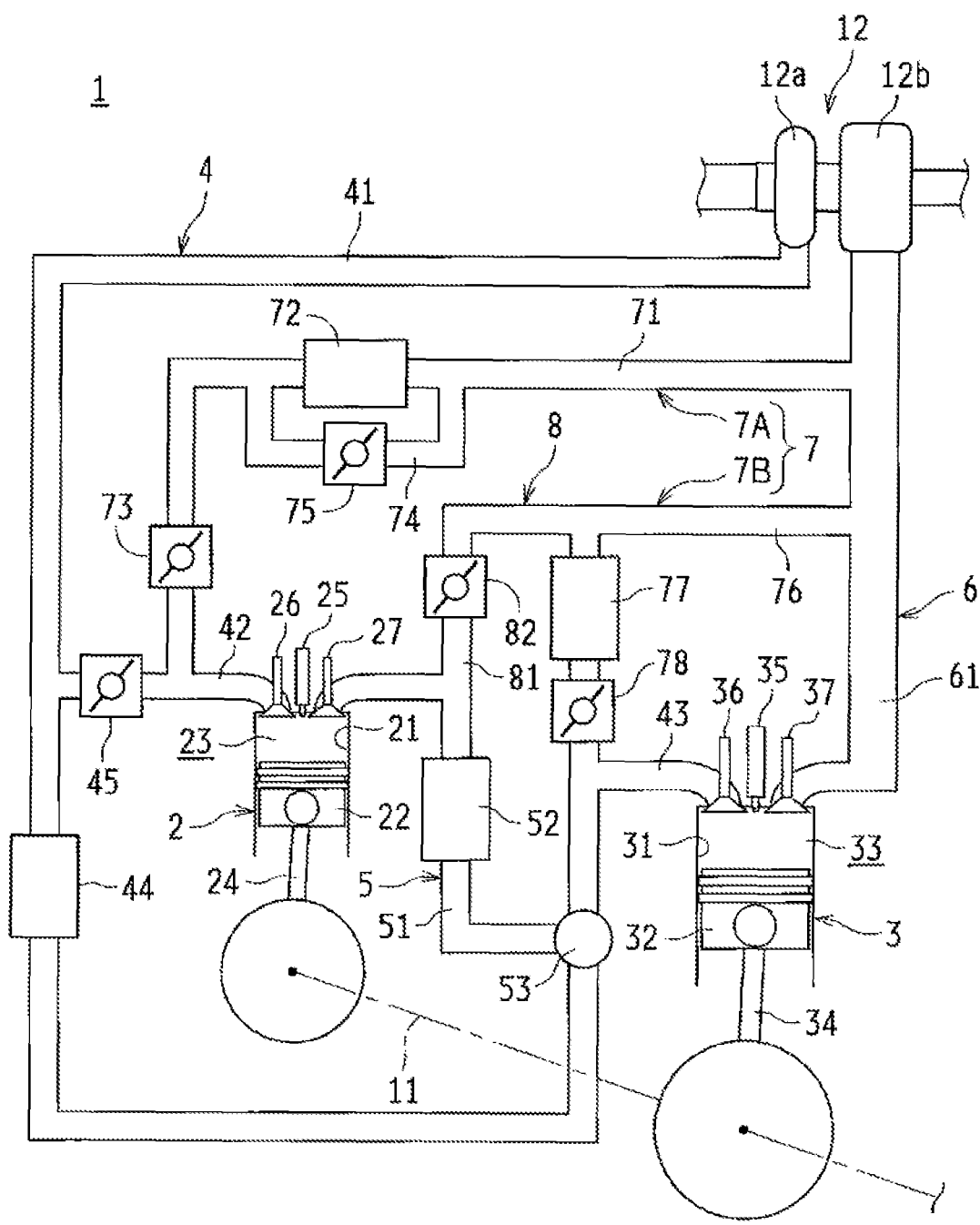
FIG. 3 is a diagram showing a schematic structure of one embodiment of an internal combustion engine related to the present invention.

FIG. 1 to FIG. 3 show an embodiment of the present invention. Prior to description of the characteristics of the present invention, a schematic structure of one embodiment of an internal combustion engine according to the present invention will be described with reference to FIG. 3.

System Structure of Internal Combustion Engine

The internal combustion engine 1 according to the present embodiment includes a fuel reformation cylinder 2 and an output cylinder 3. Further, the internal combustion engine 1 includes, as a piping system for supplying (introducing) gas or discharging (leading out) a gas to and from the fuel reformation cylinder 2 and the output cylinder 3, an air-intake system 4, a reformed fuel supply system 5, an exhaust system 6, an EGR system 7, and an output cylinder bypass system 8.

(Fuel Reformation Cylinder and Output Cylinder)

The fuel reformation cylinder 2 and the output cylinder 3 are both structured as a reciprocation type. Specifically, the cylinders 2, 3 have, in their cylinder bores 21, 31 formed in a cylinder block (not shown), pistons 22, 32 in such a manner as to be able to reciprocate, respectively.

In the fuel reformation cylinder 2, a reaction chamber (also referred to as fuel reformation chamber) 23 is formed by the cylinder bore 21, the piston 22, and a cylinder head 1*b*. In the output cylinder 3, a combustion chamber 33 is formed by the cylinder bore 31, the piston 32, and the cylinder head 1*b*.

The internal combustion engine 1 of the present embodiment includes four cylinders in the cylinder block, and one of the cylinders is structured as the fuel reformation cylinder 2, whereas three other cylinders are structured as the output cylinder 3. The numbers of the cylinders 2, 3 are not limited to the above. For example, the cylinder block may include six cylinders, and two of the cylinders are structured as the fuel reformation cylinder 2, whereas four other cylinders are structured as the output cylinder 3.

The pistons 22, 32 of the cylinders 2, 3 are connected to a crankshaft 11 through connecting rods 24, 34, respectively. This way, the motion is converted from reciprocation of the pistons 22, 32 to rotation of the crankshaft 11.

The crankshaft 11 can be connected to a screw shaft of the ship through a clutch mechanism (not shown).

The piston 22 of the fuel reformation cylinder 2 and the piston 32 of the output cylinder 3 are connected to each other through the connecting rods 24, 34 and the crankshaft 11. This enables power transmission between the cylinders 2, 3, transmission of output power from the cylinders 2, 3 to the screw shaft, and the like.

The fuel reformation cylinder 2 includes an injector 25 configured to supply a pre-reformed fuel such as light oil to the reaction chamber 23. With supply of fuel from the injector 25, the reaction chamber 23 adiabatically compresses air-fuel mixture with a high equivalence ratio. As a result, the fuel is reformed under a high temperature and high pressure environment, and a reformed fuel having a high anti-knock property such as hydrogen, carbon monoxide, and methane is generated.

The output cylinder 3 includes an injector 35 configured to supply a fuel such as light oil to the combustion chamber 33. To the combustion chamber 33, the reformed fuel generated in the fuel reformation cylinder 2 is supplied together with the air. Then, premixed combustion of the lean mixture or propagation flame combustion using a small amount of fuel injected from the injector 35 as an ignition source is performed in the combustion chamber 33. This way, the crankshaft 11 rotates with reciprocation of the piston 32, and an engine power is obtained.

(Air-Intake System)

The air-intake system 4 is configured to introduce air (fresh air) to the reaction chamber 23 of the fuel reformation cylinder 2 and the combustion chamber 33 of the output cylinder 3.

The air-intake system 4 includes a main air-intake passage 41. This main air-intake passage 41 is branched into two systems: i.e., a fuel reformation cylinder air-intake passage 42 and an output cylinder air-intake passage 43. The main air-intake passage 41 includes a compressor wheel 12*a* of a turbocharger 12.

The fuel reformation cylinder air-intake passage 42 communicates with the air-intake port of the fuel reformation cylinder 2. Between this air-intake port and the reaction chamber 23 of the fuel reformation cylinder 2, an air-intake valve 26 that can open/close is arranged. Further, the fuel reformation cylinder air-intake passage 42 includes an air-intake amount adjust valve 45 whose opening degree is adjustable.

The output cylinder air-intake passage 43 communicates with an air-intake port of the output cylinder 3. Between this air-intake port and the combustion chamber 33 of the output cylinder 3, an air-intake valve 36 that can open/close is arranged. Further, the output cylinder air-intake passage 43 includes an intake-air cooler (inter cooler) 44.

(Reformed Fuel Supply System)

The reformed fuel supply system 5 supplies reformed fuel generated in the fuel reformation cylinder 2 to the combustion chamber 33 of the output cylinder 3.

The reformed fuel supply system 5 includes a reformed fuel supply passage 51 The reformed fuel supply passage 51 includes a reformed fuel cooler 52. An upstream end of the reformed fuel supply passage 51 communicates with the exhaust port of the fuel reformation cylinder 2. Between this exhaust port and the reaction chamber 23 of the fuel reformation cylinder 2, an exhaust valve 27 that can open/close is arranged. A downstream end of the reformed fuel supply passage 51 communicates with the output cylinder air-intake passage 43.

In a communicating portion between the reformed fuel supply passage 51 and the output cylinder air-intake passage 43, a mixer 53 is provided. In the mixer 53, the reformed fuel generated by the fuel reformation cylinder 2 is mixed with the air flowing through the output cylinder air-intake passage 43, and is supplied to the combustion chamber 33 of the output cylinder 3.

(Exhaust System)

The exhaust system 6 is configured to discharge exhaust gas generated in the output cylinder 3. The exhaust system 6 includes an exhaust passage 61. The exhaust passage 61 includes a turbine wheel 12*b* of the turbocharger 12. The exhaust passage 61 communicates with an exhaust port of the output cylinder 3. Between this exhaust port and the combustion chamber 33 of the output cylinder 3, an exhaust valve 37 that can open/close is arranged.

(EGR System)

An EGR system 7 includes a fuel reformation cylinder EGR system 7A and an output cylinder EGR system 7B.

The fuel reformation cylinder EGR system 7A is configured to direct and supply a part of exhaust gas to the reaction chamber 23 of the fuel reformation cylinder 2, the exhaust gas flowing through the exhaust passage 61.

The fuel reformation cylinder EGR system 7A includes a fuel reformation cylinder EGR passage 71. The fuel reformation cylinder EGR passage 71 has its upstream end communicated with the exhaust passage 61, and has its downstream end communicated with the downstream side of the air-intake amount adjust valve 45 in the fuel reformation cylinder air-intake passage 42, respectively. The fuel reformation cylinder EGR passage 71 includes an EGR gas cooler 72. On the downstream side of the EGR gas cooler 72 in the fuel reformation cylinder EGR passage 71 (in a position closer to the fuel reformation cylinder air-intake passage 42), an EGR gas amount adjusting valve 73 is provided.

Further, the fuel reformation cylinder EGR system 7A is provided with a cooler bypass passage 74 for letting the EGR gas bypassing the EGR gas cooler 72. In the cooler bypass passage 74, a bypass amount adjusting valve 75 is provided.

The output cylinder EGR system 7B is configured to return a part of exhaust gas to the combustion chamber 33 of the output cylinder 3, the exhaust gas flowing through the exhaust passage 61. The output cylinder EGR system 7B includes an output cylinder EGR passage 76.

The output cylinder EGR passage 76 has its upstream end communicated with the exhaust passage 61, and has its downstream end communicated with the downstream side of a mixer 53 in the output cylinder air-intake passage 43, respectively. The output cylinder EGR passage 76 includes an EGR gas cooler 77. On the downstream side of the EGR gas cooler 77 in the output cylinder EGR passage 76 (in a position closer to the output cylinder air-intake passage 43), an EGR gas amount adjusting valve 78 is provided.

(Output Cylinder Bypass System)

The output cylinder bypass system 8 is used to introduce exhaust gas from the fuel reformation cylinder 2 into the exhaust passage 61 without supplying the gas to the output cylinder 3 (i.e., by bypassing the output cylinder 3).

The output cylinder bypass system 8 includes an output cylinder bypass passage 81. The output cylinder bypass passage 81 has its upstream end communicated with the upstream side of a reformed fuel cooler 52 in a reformed fuel supply passage 51, and has its downstream end communicated with the upstream side of the EGR gas cooler 77 (the side close to the exhaust passage 61) in the output cylinder EGR passage 76. Further, the output cylinder bypass passage 81 includes a bypass amount adjusting valve 82.

For the coolers 44, 52, 72, 77 provided in each of the above-described systems, engine cooling water, seawater, or the like is used as a cooling heat source for cooling the gas. Further, the coolers 44, 52, 72, 77 may be of an air-cooled type.

Basic Operation of Internal Combustion Engine

Next, a basic operation of the internal combustion engine 1 configured as described above will be described.

The air introduced into the main air-intake passage 41 is pressurized by the compressor wheel 12*a* of the turbocharger 12.

The air is then branched into the fuel reformation cylinder air-intake passage 42 and the output cylinder air-intake passage 43. At this time, the flow rate of the taken-in air flowing through the fuel reformation cylinder air-intake passage 42 is adjusted by the air-intake amount adjust valve 45.

Further, the EGR gas having flown through the fuel reformation cylinder EGR system 7A is introduced into the fuel reformation cylinder air-intake passage 42. At this time, the amount of the EGR gas introduced into the fuel reformation cylinder air-intake passage 42 is adjusted by the EGR gas amount adjusting valve 73.

Further, the temperature of the EGR gas introduced into the fuel reformation cylinder air-intake passage 42 is adjusted by the EGR gas amount bypassing the EGR gas cooler 72 according to the opening degree of the bypass amount adjusting valve 75. As a result, the air and the EGR gas are introduced into the reaction chamber 23 of the fuel reformation cylinder 2. At this time, the flow rate of the EGR gas adjusted by the opening degree of the EGR gas amount adjusting valve 73, and the temperature of the EGR gas adjusted by the opening degree of the bypass amount adjusting valve 75 are adjusted so as to set a high equivalence ratio in the reaction chamber 23, and to achieve a gas temperature in the reaction chamber 23 that enables favorable fuel reformation.

Through the process described above, fuel is supplied from the injector 25 to the reaction chamber 23 while the air and the EGR gas are introduced into the reaction chamber 23 of the fuel reformation cylinder 2.

The fuel supply amount from the injector 25 is basically set according to the required engine power. Specifically, the valve opening period of the injector 25 is set so as to achieve a target fuel supply amount according to the fuel pressure in the injector 25.

The opening timing of the injector 25 in this case is preferably set such that injection of the target fuel supply amount is completed by the time the air-intake stroke of the fuel reformation cylinder 2 is finished. However, the fuel injection period may be continued up to the middle of the compression stroke, if evenly mixed air-fuel mixture is obtainable before the piston 22 approaches the compression top dead point. This generates a homogeneous mixture (air-fuel mixture having a high equivalence ratio) in the reaction chamber 23 before the piston 22 reaches the compression top dead point.

While the piston 22 moves toward the compression top dead point, the pressure and the temperature of the reaction chamber 23 increase. In the reaction chamber 23, the air-fuel mixture having a high equivalence ratio (e.g., air-fuel mixture having an equivalent ratio of 4.0 or more) is adiabatically compressed. As a result, the dehydrogenation reaction of the fuel, a partial oxidation reaction, a steam reforming reaction, and a thermal dissociation reaction take place under a high temperature and high pressure environment, thus reforming the fuel to generate reformed fuel having a high anti-knock property, such as hydrogen, carbon monoxide, and methane.

The reformed fuel discharged from the reaction chamber 23 is cooled in the reformed fuel cooler 52 while the reformed fuel flows through the reformed fuel supply passage 51. With this cooling, preignition of the reformed fuel in the output cylinder air-intake passage 43 and the combustion chamber 33 is suppressed or reduced.

The cooled reformed fuel is then mixed with the air flowing in the output cylinder air-intake passage 43 in the mixer 53, and is supplied to the combustion chamber 33 of the output cylinder 3. Further, the EGR gas amount adjusting valve 78 is opened as needed to introduce the EGR gas into the combustion chamber 33 of the output cylinder 3 through the output cylinder EGR passage 76.

Through the above process, the air, the reformed fuel, and the EGR gas are introduced into the combustion chamber 33 of the output cylinder 3, and the equivalence ratio in the combustion chamber 33 is adjusted to approximately 0.1 to 0.8.

In the compression stroke, the leaned mixed gas is adiabatically compressed in the output cylinder 3. When the piston 32 reaches the compression top dead point, a small amount of fuel is injected from the injector 35. This causes self-ignition of the air-fuel mixture in the combustion chamber 33, and premixed combustion of the lean mixture is performed. In cases where the air-fuel mixture in the combustion chamber 33 is self-ignited (premixed compression self-ignition) without injection of the fuel from the injector 35, the injection of the fuel from the injector 35 is not necessarily required.

The above combustion reciprocates the piston 32 and rotates the crankshaft 11, thereby outputting an engine power. This engine power is transmitted to the screw shaft. Also, a part of the engine power is used as a drive source for the reciprocating movement of the piston 22 in the fuel reformation cylinder 2.

As shown in FIG. 2, the fuel reformation cylinder 2 has a cylinder liner 21a fitted into a cylinder hole (reference numeral omitted) of the cylinder block 1a. In this case, the inner surface of the cylinder liner 21a serves as the cylinder bore 21. In FIG. 2, reference numeral 1c denotes a water jacket of the cylinder block 1a, and reference numeral 1d denotes a head gasket.

The reaction chamber 23 is a space surrounded by the inner circumferential surface of the cylinder liner 21a, the top surface 22a of the piston 22 housed in the cylinder liner 21a, and a surface (hereinafter, referred to as a blast surface) 1f covering an opening of the cylinder liner 21a on the top side (close to the cylinder head 1b) in the cylinder head 1b. It is assumed that the blast surface 1f includes inner surfaces (surfaces exposed to the reaction chamber 23) of cone-like portions of the air-intake valve 26 and the exhaust valve 27 arranged in the fuel reformation cylinder 2.

Since the reaction chamber 23 has such a structure, it should be clear that the volume thereof varies depending on the reciprocation of the piston 22.

As shown in FIG. 1 and FIG. 2, a cylindrical highly heat-insulative material 10 is fitted and attached to the inner circumferential surface of the cylinder liner 21a.

The highly heat-insulative material 10 is arranged in a predetermined area of the inner circumferential surface of the cylinder liner 21a ranging from the top side edge to a predetermined position on the bottom side.

Specifically, in the predetermined area of the inner circumferential surface of the cylinder liner 21a ranging from the top side edge to the predetermined position on the bottom side, an expanded-diameter portion 21b having an expanded inner diameter is arranged. The cylindrical highly heat-insulative material 10 is fitted to the expanded-diameter portion 21b. During the fitted state, a highly heat-insulative material 10 protrudes radially inward from the inner circumferential surface of the cylinder liner 21a.

To keep the highly heat-insulative material 10 from interfering with the piston 22, a reduced-diameter portion 22b having a reduced outer diameter is arranged in a predetermined area of the outer circumferential surface of the piston 22 ranging from an edge close to the top surface 22a to a predetermined position on the bottom side.

Further, an axial dimension B of the highly heat-insulative material 10 (see FIG. 2) is suitably set according to an area that is desirably kept at a high temperature during a reforming reaction of the fuel in the reaction chamber 23. Specifically, the area that is desirably kept at a high temperature refers to a length relative to the axial direction ranging from the top edge of the cylinder liner 21a to the top surface 22a of the piston 22 at the top dead point. Therefore, the axial dimension B is preferably set to be equal to or larger than the length relative to the axial direction.

Examples of the highly heat-insulative material 10 include ceramics of various compositions generally known, iron based metals, and a suitable base material whose surface is coated with a highly heat-insulative resin.

As described above, in the embodiment to which the present invention is applied, heat radiation from the reaction chamber 23 to the outside, i.e., heat loss from the reaction chamber 23, at the time of reforming fuel in the reaction chamber 23 can be reduced by attaching the highly heat-insulative material 10 on the inner circumferential surface of the cylinder liner 21a.

Accordingly, the temperature during the reforming reaction of fuel in the reaction chamber 23 can be maintained higher as compared to a case where the highly heat-insulative material 10 is not employed. Therefore, the reforming efficiency of the fuel can be improved as compared with the case where the highly heat-insulative material 10 is not employed.

It is to be noted that the present invention is not limited to the above embodiment, and can be appropriately modified within the scope of the claims and within the scope of the scope of the present invention.

Figure 4:
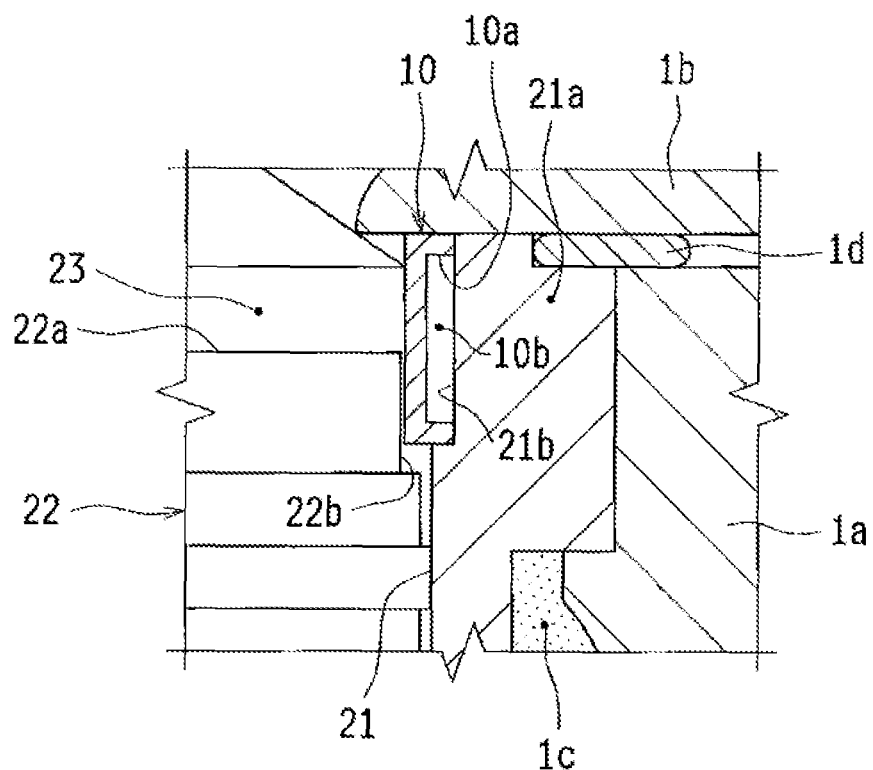
FIG. 4 is a diagram showing another embodiment of a highly heat-insulative material shown in FIG. 2.

(1) As shown in FIG. 4, for example, the highly heat-insulative material 10 of the above embodiment may have, in an axially intermediate area of its outer diameter side, an annular groove 10a opened radially outward.

In this case, while the highly heat-insulative material 10 is fitted and attached to the cylinder liner 21a, an annular space 10b surrounded by the cylinder liner 21a and the annular groove 10a forms an air layer. Therefore, heat-insulating effect of the reaction chamber 23 can be improved as much as possible. This can further reduce the heat loss from the reaction chamber 23.

(2) The above embodiment deals with a case where the cylindrical highly heat-insulative material 10 is fitted and attached to the inner circumferential surface of the cylinder liner 21a, but the present invention is not limited to this.

For example, although illustration is omitted, coating of a highly heat-insulative material may be provided by thermal-spraying or painting to a predetermined area of the inner circumferential surface of the cylinder liner 21a.

This structure can contribute to cost reduction, because the expanded-diameter portion 21b on the cylinder liner 21a and a reduced-diameter portion 22b on the piston 22 are not necessary.

(3) In addition to the above embodiment, the present invention encompasses, for example, a mode of forming a highly heat-insulative material 10 to all the surfaces (the inner circumferential surface of the cylinder liner 21a, the top surface 22a of the piston 22, and the blast surface 1f of the cylinder head 1b) constituting the reaction chamber 23; a mode of forming the highly heat-insulative material 10 to one of the top surface 22a of the piston 22 and the blast surface 1f of the cylinder head 1b; and a mode of forming a highly heat-insulative material 10 to any two of the inner circumferential surface of the cylinder liner 21a, the top surface 22a of the piston 22, and the blast surface 1f of the cylinder head 1b, although illustration of these modes are omitted.

Further, in a case of forming the highly heat-insulative material 10 on the top surface 22a of the piston 22 and the blast surface 1f of the cylinder head 1b, coating of a highly heat-insulative material is preferably provided by thermal-spraying or painting, instead of attaching the highly heat-insulative material 10.

Further, in a case of forming the highly heat-insulative material 10 on the top surface 22a of the piston 22, the piston 22 itself can be formed by an iron based metal which may serve as a highly heat-insulative material.

(4) In the above embodiment, the heat generation quantity in the fuel reformation cylinder 2 is lower than the heat generation quantity in the output cylinder 3. Taking this into account, as shown in FIG. 1, a straight distance A from the bottom portion of a water jacket 1e arranged in the cylinder head 1b, nearby the fuel reformation cylinder 2, to the blast surface if may be set larger than a straight distance (not shown) corresponding to the straight distance A, on the side of the output cylinder 3 in the cylinder head 1b. Alternatively, the water jacket 1e may be eliminated.

(5) In the above embodiment, a flow speed of a stirring flow by a swirl flow, a tumble flow, and squish in the reaction chamber 23 is preferably reduced as compared to that in the combustion chamber 33 of the output cylinder 3.

For example, a conceivable measure for reducing the flow speed of the swirl flow and the tumble flow is defining at least one of the connection position and the inclination angle of an air-intake port (not shown) relative to the reaction chamber 23. More specifically, the above measure can be any one of the following modes: reducing an offset amount in a radial direction of a central axis of the air-intake port with respect to a center of the reaction chamber 23 in a plan view; reducing an inclination angle of the air-intake port with respect to a central axis of the reaction chamber 23 in a side view; and increasing a passage area of the air-intake port to suppress or reduce its change.

A conceivable measures for lowering the flow speed of the stirring flow by the squish are: reducing unevenness of the top surface 22a of the piston 22 for fuel reformation as small as possible, preferably flattening the top surface 22a; and increasing a top clearance (an opposing distance between the piston 22 positioned at a top dead point and a blast surface 1f of the cylinder head 1b).

With this structure, heat radiation from the surfaces constituting the reaction chamber 23 (the inner circumferential surface of the cylinder liner 21a, the top surface 22a of the piston 22, and the blast surface 1f of the cylinder head 1b) to the outside, i.e., heat loss from the reaction chamber 23, at the time of reforming fuel in the reaction chamber 23 can be reduced.

Since the fuel supplied to the reaction chamber 23 hardly adheres to the surfaces constituting the reaction chamber 23, the risk of adhered fuel being scraped off by the reciprocation of the piston 22 can be reduced.

Figure 5:
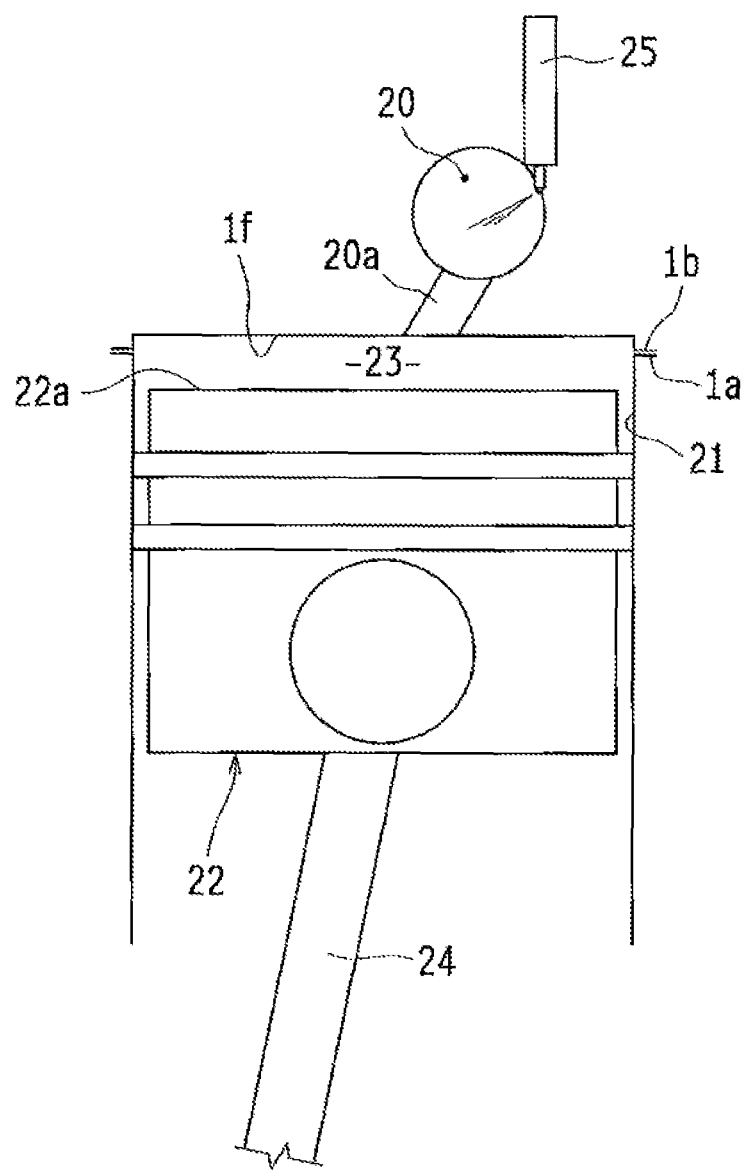
FIG. 5 is a diagram showing another embodiment of a fuel reformation cylinder shown in FIG. 1.
Figure 6:
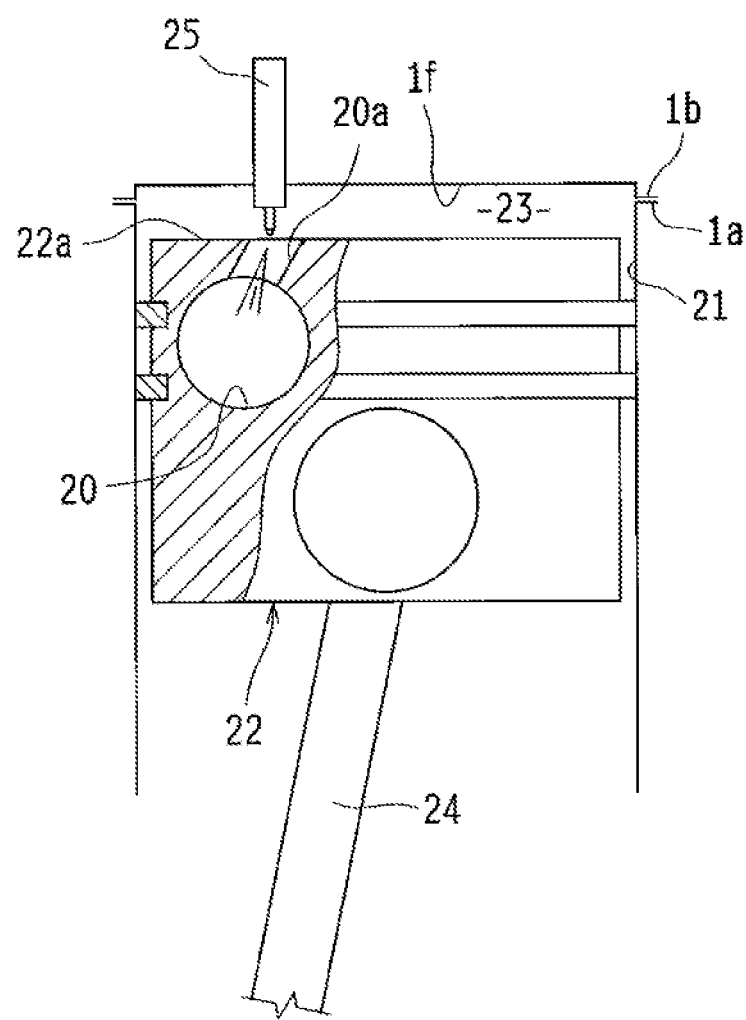
FIG. 6 is a diagram showing yet another embodiment of a fuel reformation cylinder shown in FIG. 1.
Figure 7:
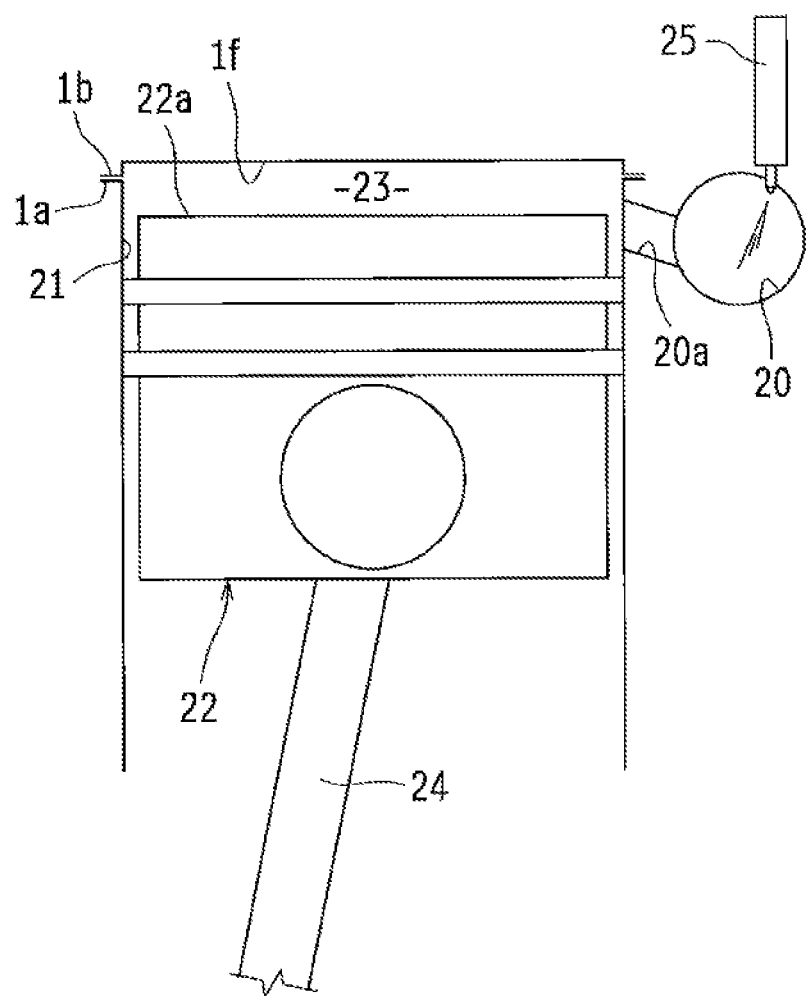
FIG. 7 is a diagram showing yet another embodiment of a fuel reformation cylinder shown in FIG. 1.
Figure 8:
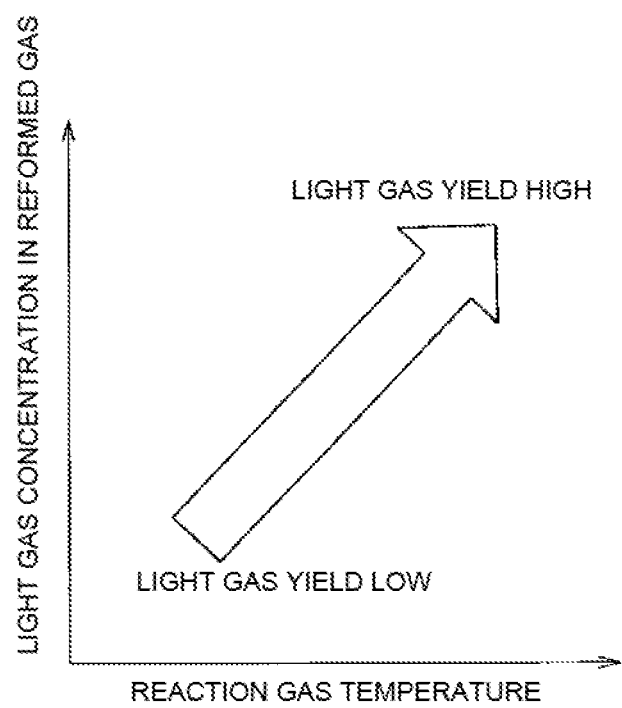
FIG. 8 is a graph showing a relationship between a temperature of a reaction gas and a light gas concentration in a reformed gas at a time of reforming fuel.

(6) FIG. 5 to FIG. 7 show other embodiments of the present invention, which will be described in detail hereinbelow. In the embodiment shown in FIG. 5 to FIG. 7, an external reaction chamber 20 is provided outside of the reaction chamber 23 of the fuel reformation cylinder 2.

Specifically, in the embodiment shown in FIG. 5, the external reaction chamber 20 is provided nearby the reaction chamber 23 in the cylinder head 1b. In the embodiment shown in FIG. 6, the external reaction chamber 20 is provided in the piston 22 for fuel reformation. In the embodiment shown in FIG. 7, the external reaction chamber 20 is provided nearby the reaction chamber 23 in the cylinder block 1a.

The external reaction chamber 20 is formed, for example, in a substantially spherical shape, and its volume is set to be constant. However, the external reaction chamber 20 may be formed in an oval shape or the like, other than the shape described above. The external reaction chamber 20 is communicated with the reaction chamber 23 through a communication passage 20a, so that fuel is directly supplied from the injector 25.

The communication passage 20a is configured so that its axis does not pass through the center of the external reaction chamber 20. The injector 25 is installed so that the injected fuel does not reach the reaction chamber 23 through the communication passage 20a.

Next, the following describes an operation related to fuel reformation of the above described embodiments.

First, during the air-intake stroke of the fuel reforming cylinder 2, the piston 22 moves from the top dead point to the bottom dead point, and the air-intake valve 26 is opened. This increases the volume of the reaction chamber 23, and reduces the internal pressure of the reaction chamber 23, thereby sucking in supplied are (containing outside air and EGR gas) with oxygen concentration suitable for fuel reformation.

Then, in the compression stroke of the fuel reformation cylinder 2, the piston 22 moves from the bottom dead point to the top dead point, which reduces the volume of the reaction chamber 23. This increases the internal pressure of the reaction chamber 23, and therefore the supplied air in the reaction chamber 23 is adiabatically compressed. Since the adiabatically compressed supplied air in the reaction chamber 23 flows into the external reaction chamber 20 through the communication passage 20a at a high speed, a high speed vortex flow is formed in the external reaction chamber 20. This brings the inside of the reaction chamber 23 and the inside of the external reaction chamber 20 into a high temperature and a high pressure state.

In the compression stroke, fuel of an equivalence ratio suitable for fuel reformation is injected from the injector 25 into the external reaction chamber 20 in the high-temperature and the high pressure state. Therefore, the fuel is rapidly mixed (premixed) with the supplied air and evaporated. When the piston 22 reaches the vicinity of the top dead point, the reforming reaction of this air-fuel mixture is started. Since the internal pressure of the external reaction chamber 20 drops lower than the internal pressure of the reaction chamber 23 as the reforming reaction progresses, the air-fuel mixture does not flow into the reaction chamber 23.

In the expansion stroke of the fuel reformation cylinder 2, the piston 22 moves from the top dead point to the bottom dead point. This increases the volume of the reaction chamber 23 and reduces the internal pressure. Therefore, the reformed fuel in the external reaction chamber 20 moves into the reaction chamber 23 and adiabatically expanded. The reformed fuel is cooled by the adiabatic expansion, and the pressure is reduced, thereby stopping the reforming reaction.

In the subsequent exhaust stroke of the fuel reformation cylinder 2, the piston 22 moves from the bottom dead point to the top dead point, and the exhaust valve 27 is opened. This way, the reformed fuel is introduced to the output cylinder air-intake passage 43 through the output cylinder bypass passage 81 and the EGR gas cooler 77.

As described, in the embodiments of FIG. 5 to FIG. 7, the fuel to be reformed is directly supplied to the external reaction chamber 20, and the fuel to be reformed is not directly supplied to the reaction chamber 23.

Since the reforming reaction of the fuel does not take place in the reaction chamber 23, the fuel supplied to the external reaction chamber 20 hardly adheres to the surfaces of the reaction chamber 23 (the cylinder head 1b, the cylinder block 1a, and the piston 22). Therefore, the risk of adhered fuel being scraped off by the reciprocation of the piston 22 can be reduced.

On the other hand, since the fuel supplied to the external reaction chamber 20 is evaporated while being mixed with the supplied air by the synergic action of the increase in the pressure and temperature associated with the rise of the piston 22 and the high speed vortex flow, the fuel hardly adheres on the inner surface of the external reaction chamber 20.

Further, although illustration is omitted, the highly heat-insulative material 10 is attached or coating of a highly heat-insulative material is provided by thermal-spraying or painting to at least a part of the surfaces constituting the reaction chamber 23 (any one of the inner circumferential surface of the cylinder liner 21a, the top surface 22a of the piston 22, and the blast surface 1f of the cylinder head 1b) in the embodiments of FIG. 5 to FIG. 7, for the aim of the present invention.

Further, although illustration is omitted, the highly heat-insulative material 10 may be attached or coating of a highly heat-insulative material may be provided by thermal-spraying or painting to the inner surface of the external reaction chamber 20.

These embodiments can reduce heat radiation from the inner surface of the external reaction chamber 20 to the outside, i.e., reduce the heat loss from the external reaction chamber 20, when the fuel is reformed in the external reaction chamber 20.

Accordingly, the temperature during the reforming reaction of fuel in the external reaction chamber 20 can be maintained higher as compared to a case where the highly heat-insulative material 10 is not employed. Therefore, the reforming efficiency of the fuel can be improved as compared with the case where the highly heat-insulative material 10 is not employed.

It should be noted that the present invention may be embodied in various other forms without departing from the spirit or essential characteristics thereof. Therefore, each of the embodiments described above and each of the embodiments described above are merely exemplary, and should not be construed as limiting the scope of the present invention. The scope of the present invention is indicated by the appended claims and is not to be limited in any way by the text of the specification. Further, the scope of the present invention encompasses all changes and modifications falling within the scope of the appended claims.

This application claims priority from Japanese Patent Application No. 2016-139574, filed in Japan on Jul. 14, 2016. The entire content of the application is hereby incorporated in the present application by reference. The entire contents of the documents cited herein are hereby incorporated in the present application by reference.

INDUSTRIAL APPLICABILITY

The present invention can be suitably applied to an internal combustion engine having a fuel reformation cylinder for reforming fuel and an output cylinder for yielding an engine power by combustion of fuel or reformed fuel.

REFERENCE SIGNS LIST 1 internal combustion engine
1a cylinder block
1b cylinder head
1f blast surface
2 fuel reformation cylinder
21 cylinder bore
21a cylinder liner
21b expanded-diameter portion
22 piston
22a top surface 22b reduced-diameter portion
23 reaction chamber
3 output cylinder
10 highly heat-insulative material
10a annular groove
20 external reaction chamber
20a communication passage

The invention claimed is:

1. An internal combustion engine including a fuel reformation cylinder for reforming a fuel and an output cylinder for yielding an engine power by combusting a fuel or a reformed fuel, wherein:
at least a part of a surface constituting a volume-variable reaction chamber of the fuel reformation cylinder includes a ring shaped protrusion protruding radially inward from an inner surface of the fuel reformation cylinder, the ring shaped protrusion made of a highly heat-insulative material;
an inner circumferential surface of the fuel reformation cylinder includes a first portion and a second portion, the first portion defining a first cylinder diameter and the second portion defining a second cylinder diameter, and the second cylinder diameter is less than the first cylinder diameter;
the ring shaped protrusion is disposed at the first portion, and a diameter defined by the ring shaped protrusion is less than the second cylinder diameter; and
a first surface of a piston defines a first diameter and a second surface of the piston defines a second diameter, the first diameter is less than each of the second diameter and the diameter defined by the ring shaped protrusion, and the second diameter is greater than the diameter defined by the ring shaped protrusion.

2. The internal combustion engine according to claim 1, wherein:
the surface constituting the volume-variable reaction chamber includes at least a portion of the inner circumferential surface of the fuel reformation cylinder, a top surface of the piston which is housed in the fuel reformation cylinder in a cylinder block, and a blast surface covering the fuel reformation cylinder in a cylinder head, and
at least one of the portion of the inner circumferential surface of the fuel reformation cylinder of the volume-variable reaction chamber, the top surface of the volume-variable reaction chamber, and the blast surface of the volume-variable reaction chamber is made of the highly heat-insulative material.

3. The internal combustion engine according to claim 1, wherein:
a flow speed of a stirring flow by a swirl flow, a tumble flow, and squish in the volume-variable reaction chamber is reduced as compared to the flow speed of the stirring flow in a combustion chamber of the output cylinder.

4. The internal combustion engine according to claim 3, wherein:
an external reaction chamber having a constant volume is provided outside the volume-variable reaction chamber and communicated with the volume-variable reaction chamber through a communication passage, and
the fuel to be reformed is supplied to the external reaction chamber.

5. The internal combustion engine according to claim 4, wherein:
an inner surface of the external reaction chamber is made of a highly heat-insulative material.

6. The internal combustion engine according to claim 1, further comprising:
a cylinder liner configured to define the inner circumferential surface of the fuel reformation cylinder; and
a cylinder head configured to define at least a portion of a blast surface, the blast surface configured to cover at least a portion of the fuel reformation cylinder; and
wherein:
the ring shaped protrusion is interposed between the blast surface and the second portion of the inner circumferential surface of the fuel reformation cylinder;
the highly heat-insulative material is disposed at the first portion of the inner circumferential surface of the fuel reformation cylinder; and
a diameter defined by the first portion of the fuel reformation cylinder is greater than the diameter defined by the second portion of the fuel reformation cylinder.

7. The internal combustion engine according to claim 1, wherein the ring shaped protrusion includes a first surface and a second surface opposite the first surface, the second surface configured to be interposed between the first surface and the first portion of the inner circumferential surface.

8. An apparatus comprising:
a fuel reformation cylinder configured to receive a first fuel and output a reformed fuel, the fuel reformation cylinder including a first inner circumferential surface and a second inner circumferential surface, and a diameter defined by the second inner circumferential surface is less than a diameter defined by the first inner circumferential surface;
a ring shaped protrusion configured to extend radially inward from the first inner circumferential surface, a highly heat-insulative material disposed on the ring shaped protrusion, and a diameter defined by the ring shaped protrusion is less than a diameter defined by the second inner circumferential surface;
an output cylinder configured to combust the reformed fuel; and
a piston including a first piston surface defining a first piston diameter and a second piston surface defining a second piston diameter, the first piston diameter is less than each of the second piston diameter and the diameter defined by the ring shaped protrusion, and the second piston diameter is greater than the diameter defined by the ring shaped protrusion.

9. The apparatus according to claim 8, wherein a volume-variable reaction chamber is defined by:
the ring shaped protrusion;
a top surface of the piston which is configured to reciprocate within in the fuel reformation cylinder; and
a surface configured to cover a top opening of the fuel reformation cylinder.

10. The apparatus according to claim 9, further comprising:
a cylinder liner configured to define the first inner circumferential surface of the fuel reformation cylinder;
a cylinder head configured to define at least a portion of the surface configured to cover the top opening of the fuel reformation cylinder; and
wherein:
the cylinder liner is disposed within a first cylinder bore of a cylinder block;
the fuel reformation cylinder includes the cylinder liner; and the piston is configured to reciprocate within the cylinder liner.

11. The apparatus according to claim 10, wherein:
the ring shaped protrusion is interposed between the surface configured to cover the top opening of the fuel reformation cylinder and the second inner circumferential surface;
the cylinder head includes a first portion and a second portion;
the first portion of the cylinder head defines at least a portion of the surface configured to cover the top opening of the fuel reformation cylinder; and
the output cylinder includes a combustion chamber defined by:
a second cylinder bore of the cylinder block;
a second piston configured to reciprocate within the second cylinder bore; and
the second portion of the cylinder head.

12. The apparatus according to claim 8, further comprising:
a cylinder liner configured to define the first inner circumferential surface and the second inner circumferential surface; and
a cylinder head configured to define at least a portion of a blast surface, the blast surface configured to cover at least a portion of the fuel reformation cylinder; and
wherein:
the ring shaped protrusion is interposed between the blast surface and the second inner circumferential surface;
the highly heat-insulative material is disposed at the first inner circumferential surface; and
a diameter defined by the first inner circumferential surface is greater than the diameter defined by the second inner circumferential surface.

13. The apparatus according to claim 8, wherein:
the ring shaped protrusion is disposed at the first inner circumferential surface; and
the ring shaped protrusion includes a first surface and a second surface opposite the first surface, the second surface configured to be interposed between the first surface and the first inner circumferential surface.

14. An apparatus comprising:
a fuel reformation cylinder including a first inner circumferential surface and a second inner circumferential surface, a diameter defined by the second inner circumferential surface is less than a diameter defined by the first inner circumferential surface;
a ring shaped protrusion configured to extend radially inward from the first inner circumferential surface, a highly heat-insulative material disposed on the ring shaped protrusion, and a diameter defined by the ring shaped protrusion is less than a diameter defined by the second inner circumferential surface; and
a piston including a first piston surface defining a first piston diameter and a second piston surface defining a second piston diameter, the first piston diameter is less than each of the second piston diameter and the diameter defined by the ring shaped protrusion, and the second piston diameter is greater than the diameter defined by the ring shaped protrusion.

15. The apparatus according to claim 14, wherein the highly heat-insulative material comprises a ceramic, an iron based metal, or a material coated with a highly heat-insulative resin.

16. The apparatus according to claim 14, wherein the highly heat-insulative material is a coating configured to be applied to the ring shaped protrusion.

17. The apparatus according to claim 14, wherein a volume-variable reaction chamber is defined by:
the ring shaped protrusion;
a top surface of the piston which is configured to reciprocate within in the fuel reformation cylinder; and
a surface configured to cover a top opening of the fuel reformation cylinder.

18. The apparatus according to claim 17, further comprising:
a cylinder head;
an air intake valve;
an exhaust valve; and
wherein the surface configured to cover the top opening of the fuel reformation cylinder includes:
at least a portion of the cylinder head;
at least a portion of the air intake valve; and
at least a portion of the exhaust valve.

19. The apparatus according to claim 14, further comprising:
a cylinder liner configured to define the first inner circumferential surface and the second inner circumferential surface; and
a cylinder head configured to define at least a portion of a blast surface, the blast surface configured to cover at least a portion of the fuel reformation cylinder; and
wherein:
the ring shaped protrusion is interposed between the blast surface and the second inner circumferential surface;
the highly heat-insulative material is disposed at the first inner circumferential surface; and
a diameter defined by the first inner circumferential surface is greater than the diameter defined by the second inner circumferential surface.

20. The apparatus according to claim 14, wherein:
the ring shaped protrusion is disposed at the first inner circumferential surface; and
the ring shaped protrusion includes a first surface and a second surface opposite the first surface, the second surface configured to be interposed between the first surface and the first inner circumferential surface.

* * * * *